(12) United States Patent
Ueda et al.

(10) Patent No.: US 11,934,087 B2
(45) Date of Patent: Mar. 19, 2024

(54) TEMPERATURE CONTROL METHOD FOR A PROJECTOR AND PROJECTOR AND NON-TRANSITORY RECORDING MEDIUM IMPLEMENTING TEMPERATURE CONTROL METHOD

(71) Applicant: CASIO COMPUTER CO., LTD., Tokyo (JP)

(72) Inventors: Tomoyuki Ueda, Tokyo (JP); Tetsuro Narikawa, Hamura (JP); Toshifumi Kase, Fuchu (JP); Akira Inoue, Tachikawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 103 days.

(21) Appl. No.: 17/539,554

(22) Filed: Dec. 1, 2021

(65) Prior Publication Data

US 2022/0171264 A1  Jun. 2, 2022

(30) Foreign Application Priority Data

Dec. 2, 2020 (JP) .................. 2020-200267

(51) Int. Cl.
*G03B 21/16* (2006.01)
*H04N 9/31* (2006.01)

(52) U.S. Cl.
CPC ........... *G03B 21/16* (2013.01); *H04N 9/3144* (2013.01)

(58) Field of Classification Search
CPC ................ G03B 21/16; H04N 9/3144
See application file for complete search history.

(56) References Cited

U.S. PATENT DOCUMENTS

2002/0001065 A1* 1/2002 Takizawa ............. G03B 21/16
353/31
2004/0239887 A1* 12/2004 Yasuda ................ H04N 5/74
353/57

(Continued)

FOREIGN PATENT DOCUMENTS

CN        1928707 A      3/2007
JP        2007-093880 A  4/2007
JP        2014-235220 A  12/2014

OTHER PUBLICATIONS

CNIPA; Application No. 202111454876.X; Office Action dated Apr. 12, 2023.

*Primary Examiner* — Bao-Luan Q Le
(74) *Attorney, Agent, or Firm* — Fitch, Even, Tabin & Flannery LLP

(57) ABSTRACT

A projector includes a cooling fan, and a processor, and the processor executes, in a case in which the cooling fan is operating in a first revolution speed mode, a control of switching an operation mode of the cooling fan to a second revolution speed mode whose revolution speed is faster than that of the first revolution speed mode in a case in which an obtained temperature detection value reaches a first threshold, and executes, in a case in which the cooling fan is operating in the second revolution speed mode, a control of switching the operation mode of the cooling fan to a revolution speed mode whose revolution speed is slower than that of the second revolution speed mode in a case in which an obtained temperature detection value decreases below a second threshold which differs from the first threshold.

15 Claims, 7 Drawing Sheets

(56) References Cited

U.S. PATENT DOCUMENTS

| | | | |
|---|---|---|---|
| 2006/0145949 A1* | 7/2006 | Hirai | G03B 21/16 345/42 |
| 2006/0192727 A1* | 8/2006 | Wang | G09G 3/3406 345/30 |
| 2007/0268462 A1* | 11/2007 | Shih | G03B 21/16 353/60 |
| 2010/0079731 A1* | 4/2010 | Okada | G03B 21/16 353/58 |
| 2016/0105652 A1* | 4/2016 | Yamashita | G03B 33/08 353/121 |
| 2017/0214897 A1* | 7/2017 | Kado | G03B 21/206 |
| 2019/0235365 A1* | 8/2019 | Noda | G03B 21/2013 |
| 2020/0241401 A1* | 7/2020 | Sano | F04D 13/12 |

* cited by examiner

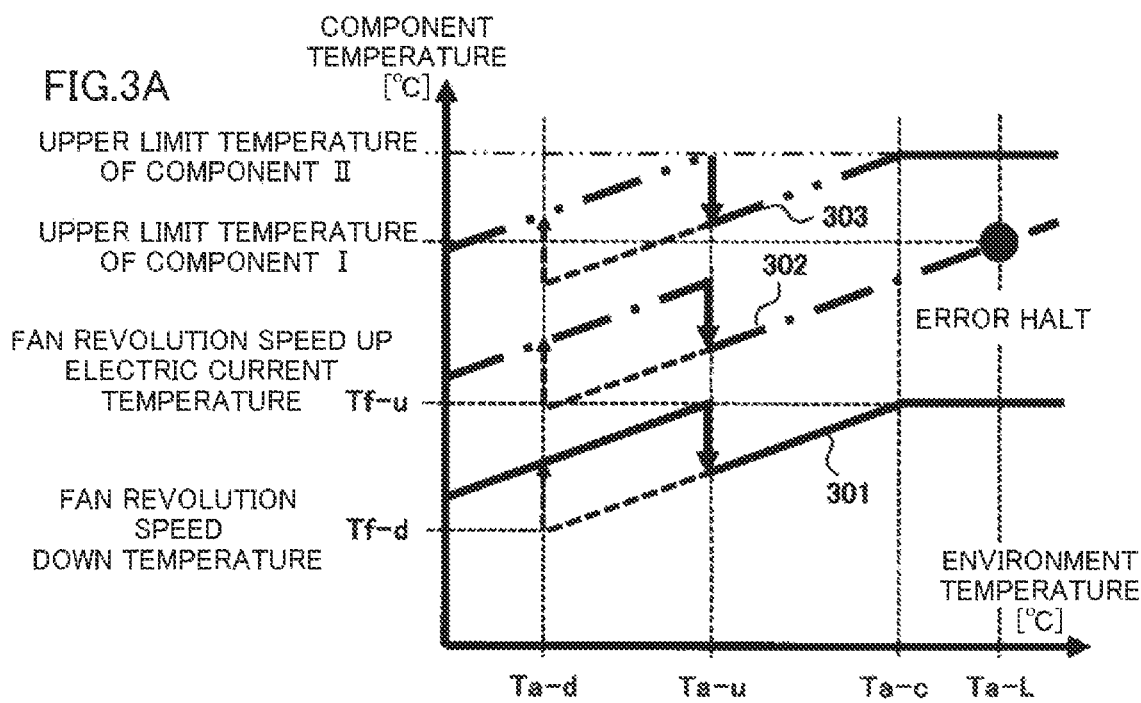
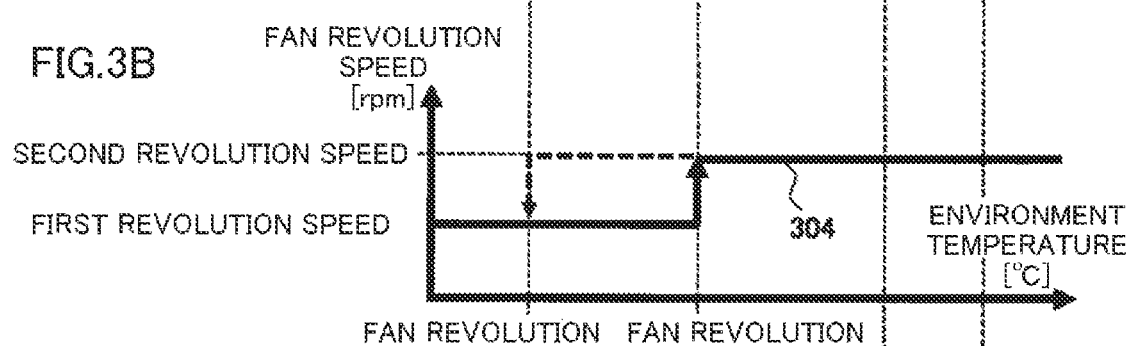
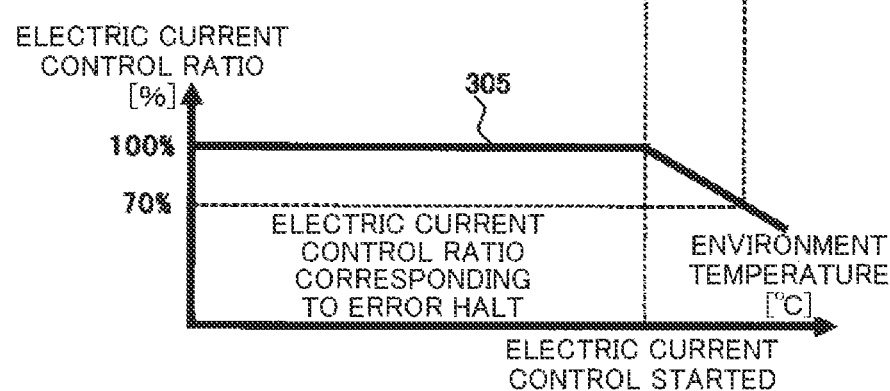

TEMPERATURE CONTROL METHOD FOR A PROJECTOR AND PROJECTOR AND NON-TRANSITORY RECORDING MEDIUM IMPLEMENTING TEMPERATURE CONTROL METHOD

CROSS-REFERENCE TO RELATED APPLICATION

This patent application is based upon the benefit of priority under 35 USC 119 from Japanese Patent Application No. 2020-200267 filed on Dec. 2, 2020, the entire disclosure of which, including the specification, claims, drawings and abstract, is incorporated herein by reference.

BACKGROUND OF THE INVENTION

Field of the Invention

The present invention relates to a projector including a cooling fan, a temperature control method for the projector, and a recoding medium.

Description of the Related Art

A projection-type display apparatus or a projector has conventionally been known which adopts a cooling fan control technology in the consideration of suppressing the driving noise of a cooling fan. For example, Japanese Patent Laid-Open No. 2014-235220 (JP-A-2014-235220) describes a projector adopting such a technology. In this technology, a cooling fan is driven based on an output of a temperature sensor for detecting an environment temperature, so that the cooling fan is caused to be driven in a first mode in which a revolution speed of the cooling fan is made constant in a first environment temperature range and is caused to be driven in a second mode in which the revolution speed of the cooling fan is changed from the revolution speed thereof in the first mode in a second environment temperature range which differs from the first environment temperature range.

SUMMARY OF THE INVENTION

According to a first aspect of the present invention, there is provided a projector including a cooling fan and a processor, wherein the processor executes, in a case in which the cooling fan is operating in a first revolution speed mode, a control of switching an operation mode of the cooling fan to a second revolution speed mode whose revolution speed is faster than that of the first revolution speed mode in a case in which an obtained temperature detection value reaches a first threshold, and executes, in a case in which the cooling fan is operating in the second revolution speed mode, a control of switching the operation mode of the cooling fan to a revolution speed mode whose revolution speed is slower than that of the second revolution speed mode in a case in which an obtained temperature detection value decreases below a second threshold which differs from the first threshold.

According to a second aspect of the present invention, there is provided a temperature control method for a projector having a cooling fan and a processor, including causing the processor to execute, in a case in which the cooling fan is operating in a first revolution speed mode, a control of switching an operation mode of the cooling fan to a second revolution speed mode whose revolution speed is faster than that of the first revolution speed mode in a case in which an obtained temperature detection value reaches a first threshold, and causing the processor to execute, in a case in which the cooling fan is operating in the second revolution speed mode, a control of switching the operation mode of the cooling fan to a revolution speed mode whose revolution speed is slower than that of the second revolution speed mode in a case in which an obtained temperature detection value decreases below a second threshold which differs from the first threshold.

According to a third aspect of the present invention, there is provided a recording medium readable by a computer, wherein the computer is caused to function as a processor configured to execute, in a case in which a cooling fan is operating in a first revolution speed mode, a control of switching an operation mode of the cooling fan to a second revolution speed mode whose revolution speed is faster than that of the first revolution speed mode in a case in which an obtained temperature detection value reaches a first threshold, and to execute, in a case in which the cooling fan is operating in the second revolution speed mode, a control of switching the operation mode of the cooling fan to a revolution speed mode whose revolution speed is slower than that of the second revolution speed mode in a case in which an obtained temperature detection value decreases below a second threshold which differs from the first threshold.

BRIEF DESCRIPTION OF THE DRAWINGS

FIG. 3 is an explanatory diagram of the embodiment;

DESCRIPTION OF THE EMBODIMENT

Figure 1:
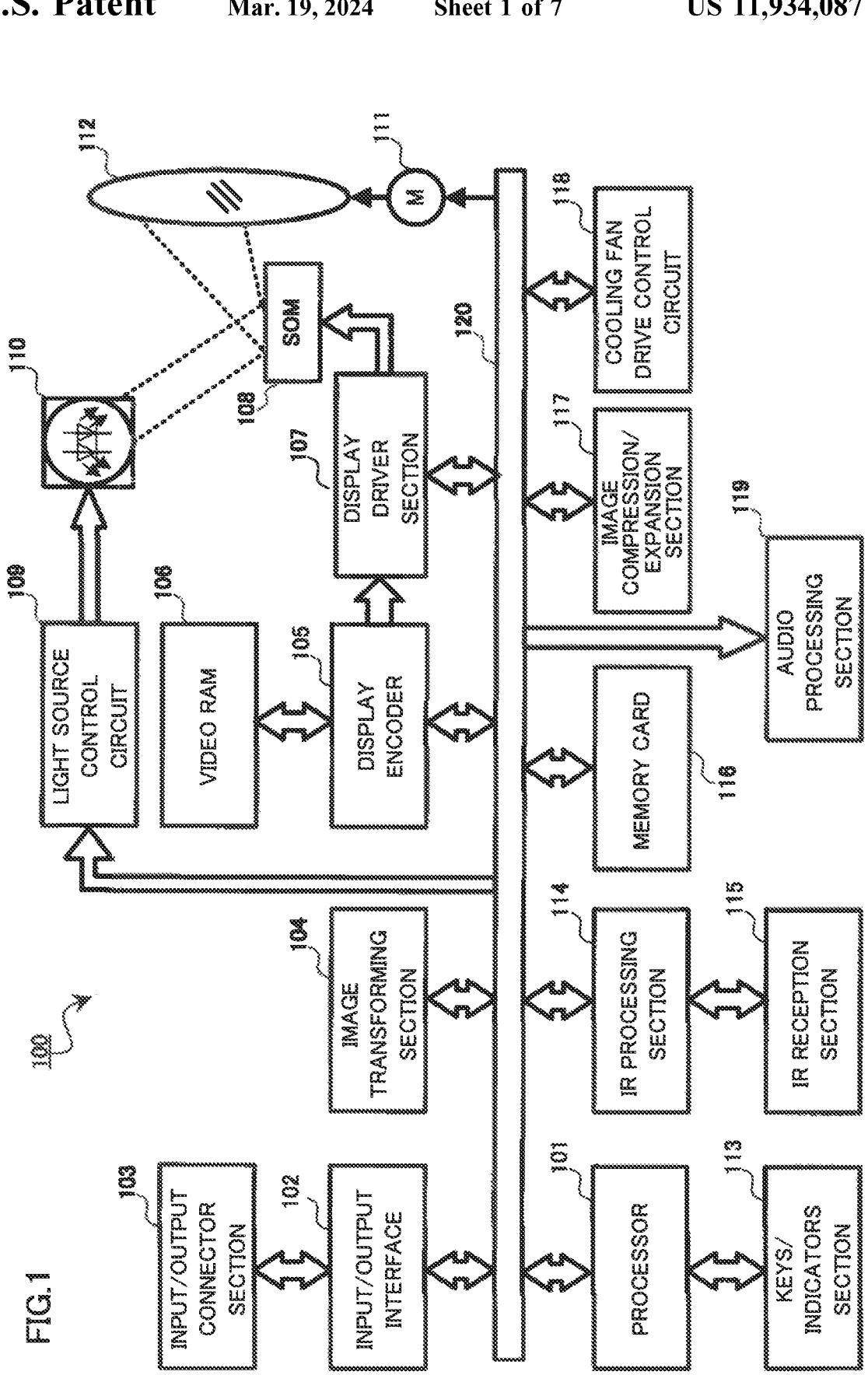
FIG. 1 is a block diagram of a projector according to an embodiment of the present invention.

Hereinafter, an embodiment of the present invention will be described while referring to drawings. FIG. 1 is a block diagram of a projector 100 according to an embodiment of the present invention. In the projector 100, a processor 101, an input and output interface (I/F) 102, an image transforming section 104, a display encoder 105, a display driver section 107, a light source control circuit 109, a lens motor 111, an Ir processing section 114, a memory card 116, an image compression/expansion section 117, a cooling fan drive controlling circuit 118, and an audio processing section 119 are connected individually to a system bus 120. The input and output I/F 102 is connected to an input and output connector section 103. A keys/indicators section 113 is connected to the processor 101. A video random access memory (RAM) 106 is connected to the display encoder 105. The display encoder 105 is connected to the display driver section 107. The display driver section 107 drives a display device 108, which is a spatial optical modulator (SOM). The light source control circuit 109 controls a light source apparatus 110. The lens motor 111 drives a movable lens group 112.

Figure 2:
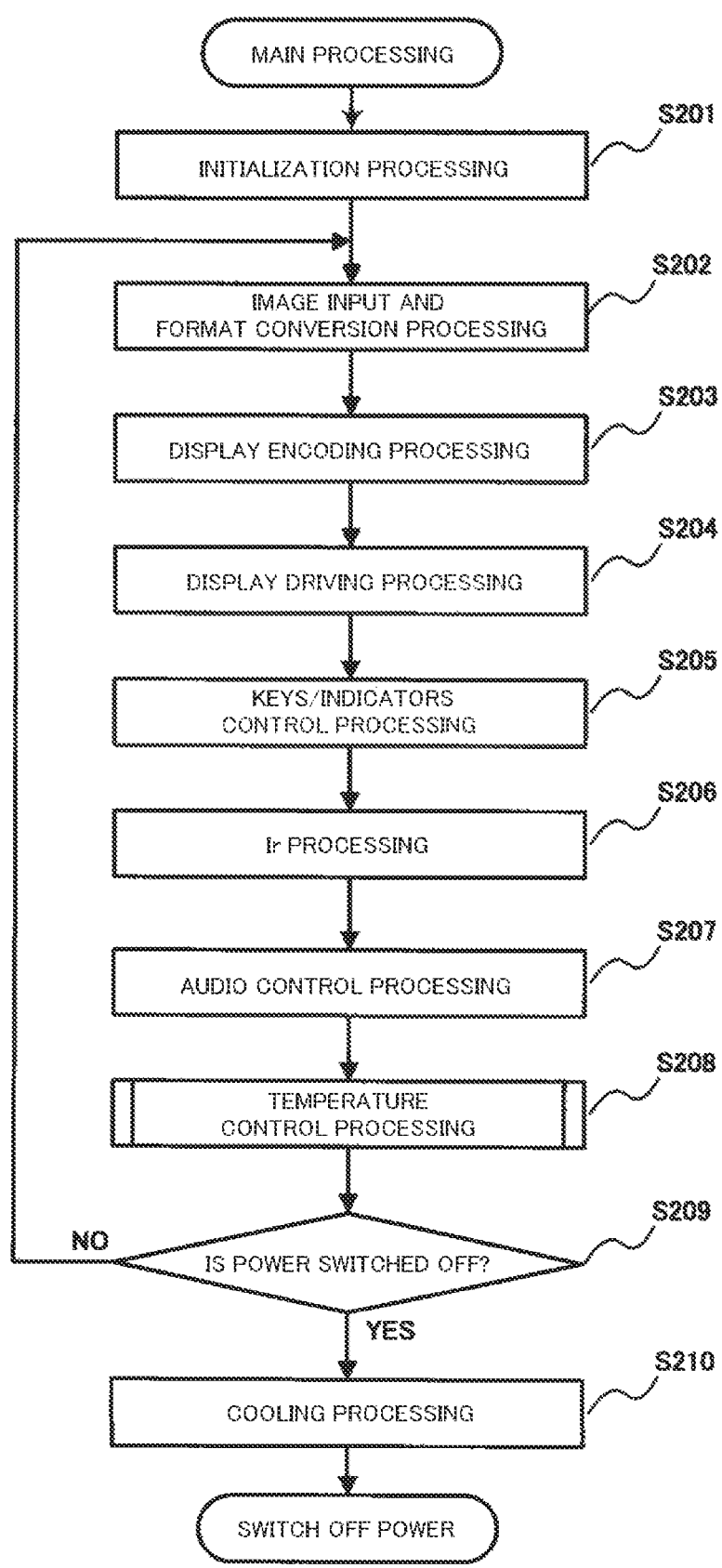
FIG. 2 is a flow chart showing an example of a main processing of an embodiment.

FIG. 2 is a flow chart showing a main processing that the processor 101 in FIG. 1 executes. This main processing constitutes an operation in which a processor, which is not particularly shown, of FIG. 1 executes a main processing program stored in a memory in the processor 101.

First of all, a processor 101 executes an initialization processing such as an initialization of a memory, not shown particularly, and setting of a revolution speed mode of a cooling fan of the projector 100 (Step S201). Thereafter, the processor 101 executes repeatedly a series of processing operations from Step S202 to Step S208, which will be described as below.

In the repeated execution of the series of processing operations, the processor 101 executes first an image input format conversion processing (Step S202). In this image input format conversion processing, the processor 101 sends image signals of various standards, which are input from the input and output connector section 103, to the image transforming section 104 via the input and output I/F 22 and the system bus 120, causes the image transforming section 104 to execute a transforming processing in which the image signals so sent are then transformed so as to be unified into an image signal of a predetermined format which is suitable for display, and causes the unified image signal so transformed to be sent to the display encoder 105 via the system bus 120.

Next, the processor 101 executes a display encoding processing (Step S203). In this display encoding processing, the processor 101 causes the display encoder 105 to deploy and store the image signal received from the image transforming section 104 in the video RAM 106. Then, the processor 101 causes the display encoder 105 to generate a video signal from the contents stored in the video RAM 106 for output to the display deriver 107.

Subsequently, the processor 101 executes a display driving processing (Step S204). In this display driving processing, the processor 101 causes the display driver section 107 to drive the display device 108, which is the spatial optical modulator (SOM), at an appropriate frame rate in response to the image signal output from the display encoder 105. On the other hand, the processor 101 controls the light source control circuit 109. The light source control circuit 109 controls the operation of an excitation light shining device of the light source apparatus 110 separately so that light having a wavelength in a predetermined wavelength range required for generation of an image is emitted from the light source apparatus 110. As a result, light emitted from the light source apparatus 110 is shined on the display device 108, which is driven by the display driver section 107, by way of a light guiding optical system, whereby an optical image is formed by light reflected on the display device 108. Then, the optical image so formed is then projected on to a screen, not shown, by way of a projection optical system of the movable lens group 112 for display thereon. As this occurs, the movable lens group 112 is driven for zooming or focusing by the lens motor 111, which is controlled via the system bus 120 by the processor 101.

Although a detailed description is omitted here, at this time, a blue laser diode, a red light emitting diode, a luminescent wheel, and a color wheel, which are not shown particularly, inside the light source apparatus 110 are controlled by the processor 101, so that lights in blue, red, and green wavelength ranges are caused to be emitted in a time sharing fashion.

Next, the processor 101 executes a keys/indicators control processing (Step S205). In this keys/indicators control processing, the processor 101 controls the keys/indicators section 113. The keys/indicators section 113 is made up of keys and indicators which are provided on a housing, which is not particularly shown, of the projector 100. Operation signals of the keys/indicators section 113 are input into the processor 110 for processing. Additionally, the processor 101 causes individual indicators of the keys/indicators section 113 to be illuminated.

Subsequently, the processor 101 executes an Ir processing (Step S206). In this Ir processing, the processor 101 causes an Ir reception section 115 to receive a key operation signal from a remote controller, which is not particularly shown, and causes the Ir processing section 114 to demodulate the key operation signal so received into a code signal. A demodulated signal which is obtained by this demodulation processing is input into the processor 101 for processing.

Next, the processor 101 executes an audio control processing (Step S207). In this audio control processing, the processor 101 causes the audio processing section 119 by way of the system bus 120 to generate sounds that are emitted loudly in association with projected images which are projected on a screen. The audio processing section 119 includes a circuitry for a sound source such as a pulse code modulation (PCM) sound source or the like. With the projector 100 set in a projection mode and a reproducing mode, the audio processing section 119 converts audio data generated by the PCM sound source into analog signals using a digital/analog (D/A) converter, which is not particularly shown, and drives a speaker, which is not particularly shown, so as to output sound or voice loudly.

Next, the processor 101 executes a temperature control processing (Step S208). In this temperature control processing, the processor 101 causes LD thermistors, which constitute multiple temperature sensors installed in the light source apparatus 110 or the like, to detect a temperature so as not only to control the revolution speed of a cooling fan but also to cause the light source control circuit 109 to control an electric current supplied to the light source apparatus 110 based on the results of the temperature detection so carried out. This temperature control processing will be described in detail later on.

Lastly, the processor 101 determines whether a user has switched off the projector 100 on the keys/indicators section 113 (Step S209). If the result of the determination is negative or NO, returning to the processing in Step S202, the processor 101 executes repeatedly the series of processing operations from Step S202 to Step S209, which have been described heretofore.

If the processor 101 determines otherwise in Step S209 that the user has switched off the projector 100, making the determination in Step S209 affirmative or YES, the processor 101 causes the cooling fan drive controlling circuit 118 to keep the cooling fan revolving for a certain period of time using a timer and thereafter switches off the power supply to a main body of the projector 100.

Although not shown particularly, in a case in which the user inserts a memory card 116, which is a detachable recording medium, into a memory slot, not particularly shown, of the main body, the processor 101 causes the image compression/expansion section 117 to execute a recording processing in which a luminance signal and a color difference signal of the image signal are data compressed through processing such as Adaptive Discrete Cosine Transform (ADCT), Huffman coding and the like, and the compressed data is sequentially written on the memory card 116. On the other hand, with the projector 100 set in a reproducing mode, the processor 101 causes the image compression/expansion section 117 to read out the image data recorded in the memory card 116, expand the individual image data that makes up a series of dynamic images frame by frame, and output the image data so expanded to the display encoder 105 byway of the image transforming section 104. In this way, the image compression/expansion section 117 can execute a reproduction processing of dynamic images or the like based on the image data stored in the memory card 116.

FIG. 3 is an explanatory diagram of the embodiment of the present invention. In general, in a projector, in a case in which electronic components inside the projector are heated to a high temperature as a result of an environment temperature, which is a temperature around the projector (that is, for example, a place in a room or a factory where the projector is used), getting high, the electronic components are protected by increasing the revolution speed of a cooling fan, which is not particularly shown, and dropping the luminance brightness of a light source by suppressing an electric current to be supplied to a light source apparatus.

FIG. 3A is a graph showing examples of temperature characteristics 301, 302, and 303 of the embodiment of the present invention.

The temperature characteristic 301, which is indicated by a solid line, is an example of a temperature detection value (Component Temperature: an axis of ordinate) that is detected by an LD thermistor, not particularly shown, which is placed near to the light source apparatus 110 shown in FIG. 1. This temperature characteristic 301 is a temperature detection value itself that is output by the LD thermistor that is placed near to a laser diode light source for detecting a temperature of the laser diode light source. In the case that there are provided multiple LD thermistors, for example, a maximum value or an average value of multiple output values from the multiple LD thermistors is taken as a temperature detection value. One LD thermistor may be disposed for each LD bank made up of multiple laser diodes. Alternatively, one LD thermistor may be disposed for each of multiple laser diodes.

A temperature characteristic indicated by a broken line for the temperature characteristic 301 indicated by the solid line is an example of a temperature detection value that is detected by the LD thermistor in a temperature range where the environment temperature varies from Ta-u to Ta-d in a case in which the cooling fan is operating in a second revolution speed mode, which is a high revolution operation mode.

The temperature characteristic 302, which is indicated by an alternate long and short dash line, is an estimation value of a temperature characteristic of each of the electronic circuits shown in FIG. 2 excluding the light source apparatus 110 and the light source control circuit 109, which are shown in FIG. 1. In the development, thermocouples are attached individually to portions where the electronic circuits are provided, and temperatures of the thermocouples are measured experimentally, as a result of which the temperature characteristic 302 is estimated as a correlative characteristic with the temperature characteristic 301 of the LD thermistor. Hereinafter, these electronic circuits will generally be referred to as a temperature observation required component I.

A temperature characteristic indicated by a broken line for the temperature characteristic 302 indicated by the alternate long and short dash line is an example of a temperature characteristic 302 estimated in the temperature range where the environment temperature varies from Ta-u to Ta-d in a case in which the cooling fan is operating in the second revolution speed mode, which is the high revolution operation mode.

A temperature characteristic 303, which is indicated by a chain double-dashed line, is an estimation value of a temperature characteristic, which is controlled in the embodiment of the present invention, at portions where the light source apparatus 110 and the light source control circuit 109 are provided. In this case, too, as in the case with the temperature characteristic 302, in the development, thermocouples are attached individually to the portions of the light source apparatus 110 and the light source control circuit 109, and temperatures of the thermocouples are measured experimentally, as a result of which the temperature characteristic 303 is estimated as a correlative characteristic with the temperature characteristic 301 of the LD thermistor. These electronic circuits will generally be referred to as a temperature observation required component II.

A temperature characteristic indicated by a broken line for the temperature characteristic 303 indicated by the chain double-dashed line is an example of a temperature characteristic 303 estimated in the temperature range where the environment temperature varies from Ta-u to Ta-d in a case in which the cooling fan is operating in the second revolution speed mode, which is the high revolution operation mode.

FIG. 3B is a graph showing a fan revolution speed characteristic 304 showing a change in a revolution speed (an axis of ordinate) (rpm) of a cooling fan which is controlled by the cooling fan drive controlling circuit 118 shown in FIG. 1.

FIG. 3C is a graph showing an electric current control ratio characteristic 305 in which an electric current control ratio (an axis of ordinate) to an electric current value at which the light source control circuit 109 operates the light source apparatus 110 to the full (100%) is plotted for each environment temperature on an axis of abscissa.

The processor 101 executes an error halt processing on the projector on the assumption that an upper limit temperature of the component I is reached in a case in which the electric current ratio is controlled to be a set value of, for example, 70% (the electric current control ratio=70%).

In FIG. 3, the environment temperature is set in, for example, a thermostatic bath or a hydrostat bath, and the projector is placed in the thermostatic or hydrostat bath for measurement.

In the embodiment of the present invention, the processor 101 shown in FIG. 1 controls the revolution speed of the cooling fan under the following conditions based on a temperature detection value detected by the LD thermistor by controlling the cooling fan drive controlling circuit 118.

<Control Conditions>

Condition 1: In the case that the revolution speed of the cooling fan (hereinafter, referred to as the "fan revolution speed") is in a low revolution speed mode (a first revolution speed mode) and that the temperature detection value of the LD thermistor reaches a temperature threshold Tf-u (a first threshold), the fan revolution speed is increased to a high revolution speed mode (a second revolution speed mode).

Condition 2: In the case that the fan revolution speed is in the high revolution speed mode (the second revolution speed mode) and that the temperature detection value of the LD thermistor reaches the temperature threshold Tf-u (the first threshold), the electric current control is started.

Condition 3: In the case that the fan revolution speed is in the high revolution speed mode (the second revolution speed mode) and that the temperature detection value of the LD thermistor decreases below a temperature threshold Tf-d (a second threshold), the fan revolution speed is decreased to the low revolution speed mode (the first revolution speed mode).

Condition 4: The fan revolution speed mode is not switched over until a set period of time (for example, 5 minutes) elapses since a brightness mode (a color mode) is switched over by the user.

In the embodiment of the present invention, in the case that the processor 101 determines that the temperature detection value of the LD thermistor reaches the temperature threshold Tf-u (the first threshold) while the cooling fan is revolving in the low revolution speed mode, the processor 101 causes the revolution speed mode of the cooling fan to be changed from the low revolution speed mode to the high revolution speed mode.

Further, in the case that the processor 101 determines that the temperature detection value of the LD thermistor reaches the temperature threshold Tf-u (the first threshold) while the cooling fan is revolving in the high revolution speed mode, the processor 101 controls the electric current supplied to the light source control circuit 109 of the light source apparatus 110.

Since the temperature estimation value of the temperature observation required component I exceeds the upper limit temperature (a "component I upper limit temperature" shown in FIG. 3A) in a case in which the electric current ratio reaches, for example, 70% (in a case in which the electric current ratio reaches the environment temperature Ta-L) as a result of the electric current control so made, the processor 101 executes the error halt processing on the projector 100.

In the case that a temperature detection value obtained exceeds a third threshold while the cooling fan is operating in the second revolution speed mode, which is the high revolution speed mode, the processor 101 may execute an electric current control to reduce the electric current that is supplied to the light source apparatus 110.

In the case that the revolution speed mode of the cooling fan is switched from the low revolution speed mode to the high revolution speed mode because the temperature estimation value of the LD thermistor reaches the temperature threshold Tf-u (the first threshold) in a case in which the projector 100 is switched on, and thereafter the temperature estimation value of the LD thermistor decreases below the temperature threshold Tf-d (the second threshold) while the cooling fan is revolving in the high revolution speed mode, the cooling fan is switched to the low revolution speed mode as indicated by a downward arrow of a characteristic indicated by a broken line in FIG. 3B.

In this case, although the operation mode of the cooling fan may be switched to a revolution speed mode which is the same as the first revolution speed mode, the operation mode of the cooling fan should be switched to a revolution speed mode whose revolution speed is slower than that of the second revolution speed mode.

Thus, as has been described heretofore, in the embodiment of the present invention, the processor 101 can control the revolution speed of the cooling fan highly accurately via the cooling fan drive controlling circuit 118 based on the temperature detection value detected by the LD thermistor placed in the vicinity of the light source apparatus 110. In particular, in the embodiment of the present invention, the cooling fan can be kept revolving in the low revolution speed mode under the low environment temperature conditions, whereby a comfortable projector using environment can be provided for the user by reducing the level of noise generated by the projector 100. In addition, the temperature observation required component I inside the projector 100 can be protected safely and highly accurately by employing in parallel the electric current control in the high revolution speed mode based on the temperature detection value from the LD thermistor.

Figure 4:
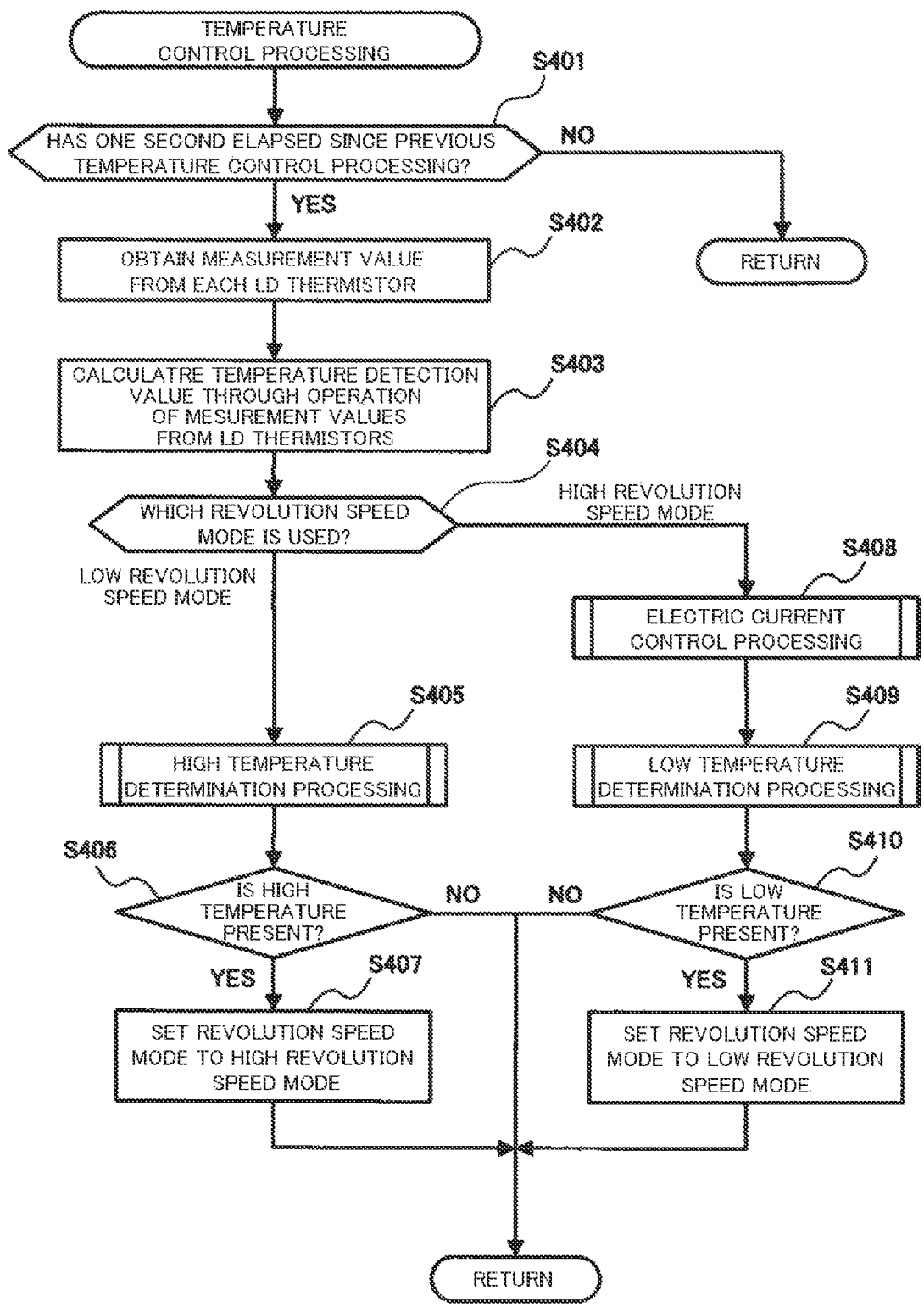
FIG. 4 is a flow chart showing a detailed example of a temperature control processing.

FIG. 4 is a flow chart showing a detailed example of the temperature control processing in Step S208 in the aforesaid main processing shown in FIG. 2, which is executed by the processor 101 shown in FIG. 1 to realize the operations of the embodiment of the present invention which are described in relation to FIG. 3. First of all, in executing the main processing in FIG. 2 repeatedly, the processor 101 determines whether one second has elapsed since the previous temperature control processing using a timer not shown particularly (Step S401). Since the temperature control processing is desirably executed every certain period of time, for example, one second, if the determination made by the processor 101 in Step S401 is negative or NO, the processor 101 returns to the program of the origin of invocation as it is and ends the temperature control processing in Step S208 in FIG. 2, which is shown in the flow chart shown in FIG. 4.

If the determination made by the processor 101 in Step S401 is affirmative or YES as a result of one second having elapsed since the previous temperature control processing, the processor 101 obtains measurement values of the multiple LD thermistors (Step S402). Then, the processor 101 calculates a temperature detection value through an operation of obtaining, for example, an average value from the multiple temperature measurement values from the multiple LD thermistors which are obtained in Step S402 (Step S403). The arithmetic operation does not necessarily have to be carried out, and hence, it is good enough to determine a value for use for a determination criterion. in a case in which only one LD thermistor is provided, the processor 101 takes a measurement value of that LD thermistor as a temperature detection value thereof.

Thereafter, the processor 101 determines on the current revolution speed mode of the cooling fan via the cooling fan drive controlling circuit 118 shown in FIG. 1 (Step S404).

If the processor 101 determines in Step S404 that the current revolution speed mode is the low revolution speed mode, the processor 101 executes a high temperature determination processing in which the processor 101 determines whether the temperature detection value calculated in Step S403 has reached to a predetermined high temperature value (Step S405).

Next, the processor 101 determines from the result of the high temperature determination processing in Step S405 whether the determination that the predetermined high temperature value is reached has been made (Step S406).

If the processor 101 determines that the predetermined high temperature value is reached, that is, a high temperature state is present (YES in Step S406), the processor 101 sets the revolution speed mode of the cooling fan at the high revolution speed mode in which the cooling fan revolves at the high revolution speed (Step S407). Thereafter, the processor 101 returns to the program of the origin of invocation and ends the temperature control processing in Step S208 in FIG. 2, which is shown in the flow chart shown in FIG. 4.

If the processor 101 does not determine that the high temperature state is present (NO in Step S406), the processor 101 does not change the revolution speed mode of the cooling fan and returns as it is to end the temperature control processing in Step S208 in FIG. 2, which is shown in the flow chart FIG. 4.

If the processor 101 determines in Step S404 that the current revolution speed mode of the cooling fan is the high revolution speed mode, the processor 101 causes the light source control circuit 109 to execute the electric current control processing on the light source apparatus 110 (Step S408). This electric current control processing will be described in detail later on.

Next, the processor 101 determines from the result of a low temperature determination processing in Step S409 whether a predetermined low temperature has been reached, that is, a low temperature state is present (Step S410).

If the processor 101 determines that the low temperature state is present (YES in Step S410), the processor 101 sets the revolution speed mode of the cooling fan at the low revolution speed mode in which the cooling fan is revolving at a low revolution speed (Step S411). Thereafter, the processor 101 returns to the program of the origin of invocation and ends the temperature control processing in Step S208 in FIG. 2, which is shown in the flow chart shown in FIG. 4.

If the processor 101 does not determine that the low temperature state is present (NO in Step S410), the processor 101 does not change the revolution speed mode of the cooling fan and returns as it is to end the temperature control processing in Step S208 in FIG. 2, which is shown in the flow chart shown in FIG. 4.

Figure 5:
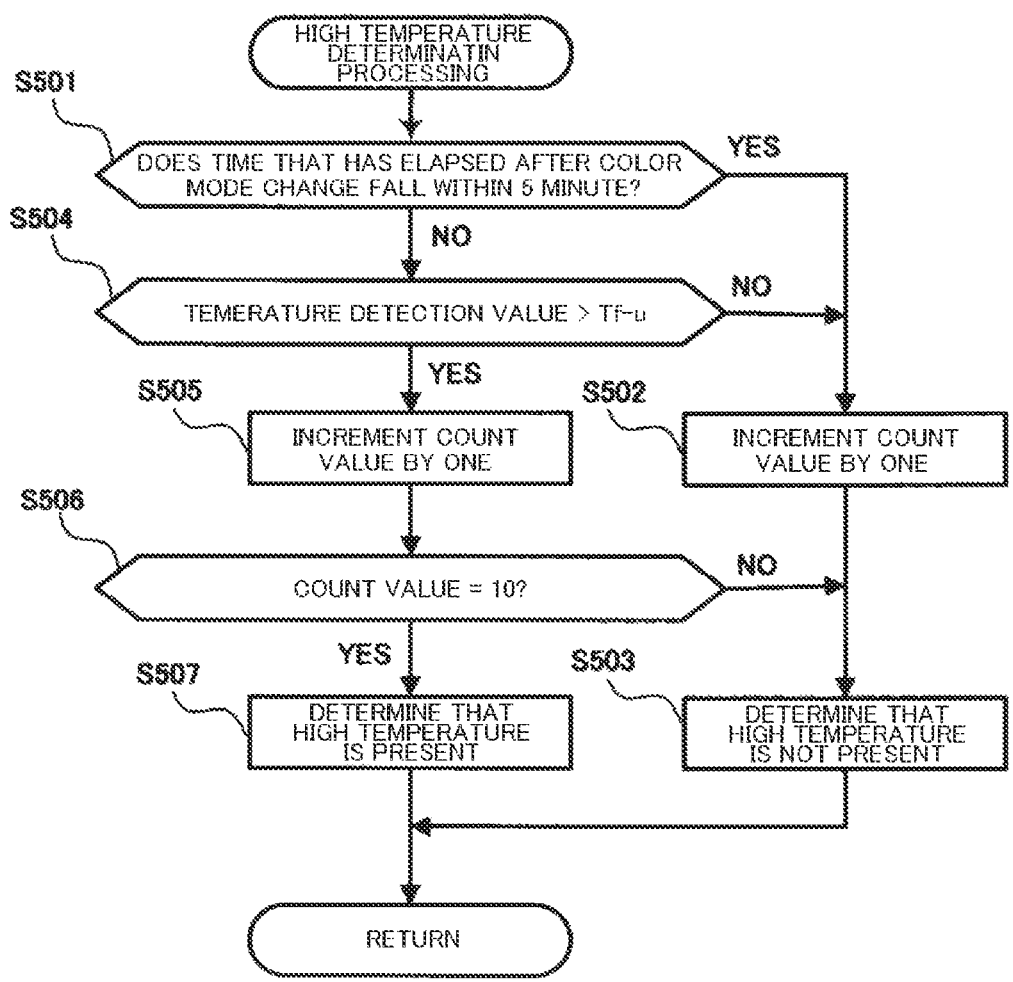
FIG. 5 is a flow chart showing a detailed example of a high temperature determination processing.

FIG. 5 is a flow chart showing a detailed example of the high temperature determination processing in Step S405 in FIG. 4. First of all, in the case that the user changes a designation item which the user designates in the projector, for example, a designation item regarding a light source color (a color mode) of the light source apparatus 110, the processor 101 determines whether a period of time that has elapsed after the change falls within, for example, five minutes (Step S501). Understanding that the projection by the projector becomes unstable immediately after the color mode is switched over, the processor 101 controls so that the revolution speed mode of the cooling fan is not changed until a predetermined period of time elapses after a switchover of the projection mode such as the color mode.

If the determination made by the processor 101 in Step S501 is affirmative or YES, the processor 101 increments a count value by one, the count value being a variant on a memory, which is not shown particularly, for execution of a temperature determination (Step S502).

Subsequently, the processor 101 determines that no high temperature state has been reached (Step S503). Thereafter, the processor 101 returns to end the high temperature determination processing in Step S405 in FIG. 4, which is shown in the flow chart shown in FIG. 5.

If the determination made by the processor 101 in S501 is negative or NO, the processor 101 determines whether the temperature detection value calculated in Step S403 in FIG. 4 has exceeded the predetermined threshold Tf-u (refer to FIG. 3) (Step S504).

If the determination made by the processor 101 in Step S504 is negative or NO, the processor 101 increments the count value for temperature determination by one in Step S502 described above, thereafter determines in Step S503 described above that the high temperature state is not present, and ends the high temperature determination processing in Step S405 in FIG. 4, which is shown in the flow chart shown in FIG. 5.

If the determination made by the processor 101 in Step S504 is affirmative or YES, the processor 101 increments the count value for temperature determination by one and thereafter determines whether the count value has reached 10 (Step S506). Since the temperature control processing in FIG. 4 is executed in increments of one second (refer to Step S401 in FIG. 4), the processor 101 determines in Step S506 whether the high temperature state in Step S504 continues for 10 seconds without interruption.

The determination made in Step S506 is kept negative or NO until the high temperature state continues for 10 seconds, and the processor 101 determines in Step S503 described above that the high temperature state is not present, ending the high temperature determination processing in Step S405 in FIG. 4, which is shown in the flow chart shown in FIG. 5.

If the determination made by the processor 101 in Step S506 is affirmative or YES as a result of the high temperature state continuing for 10 seconds, the processor 101 determines that the high temperature state has been reached (Step S507). Thereafter, the processor 101 returns to end the high temperature determination processing in Step S405 in FIG. 4, which is shown in the flow chart shown in FIG. 5.

Figure 6:
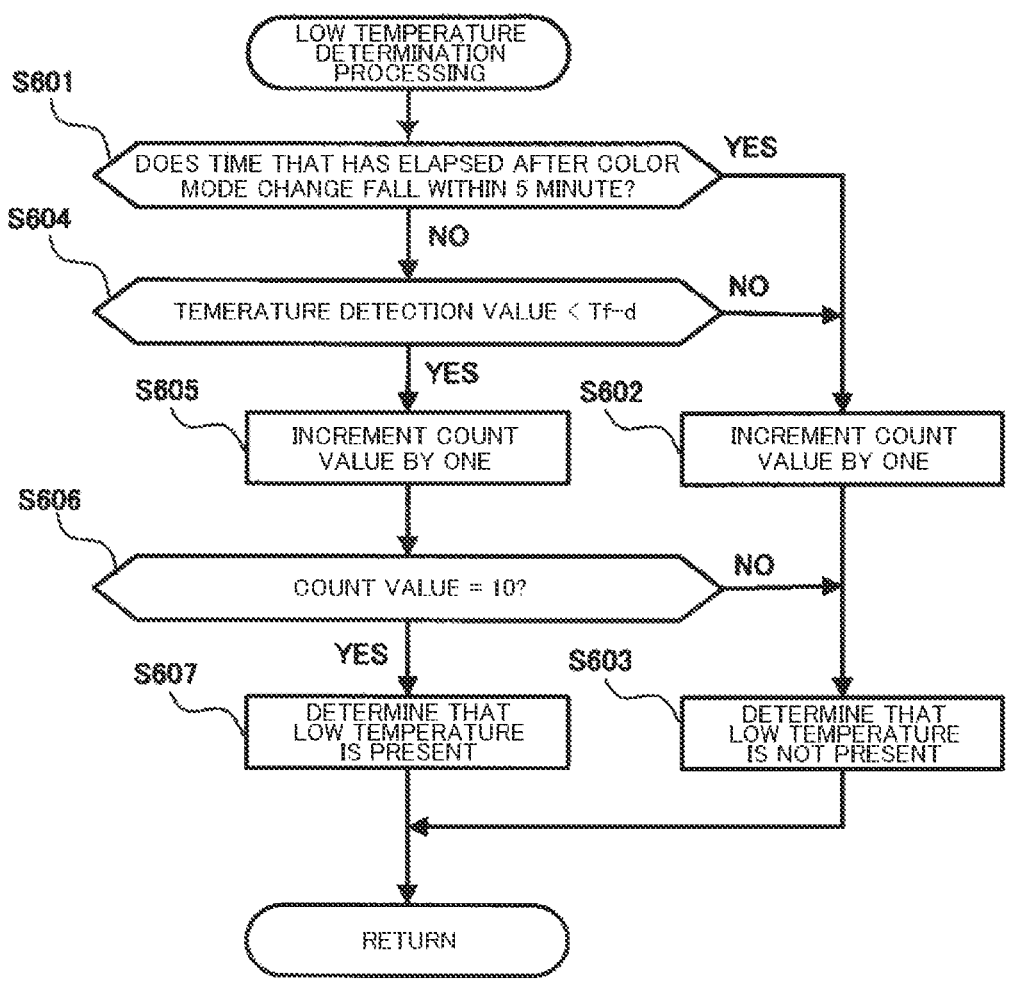
FIG. 6 is a flow chart showing a detailed example of a low temperature determination processing.

FIG. 6 is a flow chart showing a detailed example of the low temperature determination processing in Step S409 in FIG. 4. First of all, in the case that the user changes the color mode which the user designates in the projector, the processor 101 determines whether the time that has elapsed since the change falls within, for example, five minutes (Step S601).

If the determination made by the processor 101 in Step S601 is affirmative or YES, the processor 101 increments the count value for temperature determination by one (Step S602).

Subsequently, the processor 101 determines that the low temperature state is not recovered (Step S603). Thereafter, the processor 101 returns to end the low temperature determination processing in Step S409 in FIG. 4, which is shown in the flow chart shown in FIG. 5.

If the determination made by the processor 101 in Step S601 described above is negative or NO, the processor 101 determines whether the temperature detection value calculated in Step S403 in FIG. 4 has decreased below the predetermined threshold Tf-d (refer to FIG. 3) (Step S604).

If the determination made by the processor 101 in Step S604 is negative or NO, the processor 101 increments the count value for temperature determination by one in Step S602 described above and thereafter determines in step S603 described above that the low temperature state is not present, ending the low temperature determination processing in FIG. 4, which is shown in the flow chart shown in FIG. 5.

If the determination made by the processor 101 in Step S604 is affirmative or YES, the processor 101 increments the count value for temperature determination by one and thereafter determines whether the count value has reached 10 (Step S606). As in the case with the high temperature determination processing (Step S506) in FIG. 5, the processor 101 determines in Step S606 whether the low temperature state in Step S604 continues for 10 seconds without interruption.

The determination made by the processor 101 in Step S606 remains negative or NO until 10 seconds elapse while the low temperature state is maintained, and the processor 101 determines in Step S603 described above that the low temperature state is not present, ending the low temperature state determination processing in Step S409 in FIG. 4, which is shown in the flow chart shown in FIG. 5.

If the determination made by the processor 101 in Step S606 is affirmative or YES as a result of 10 seconds elapsing while the low temperature state is maintained, the processor 101 determines that the low temperature state has been reached (Step S607). Thereafter, the processor 101 returns to end the low temperature determination processing in Step S409 in FIG. 4, which is shown in the flow chart shown in FIG. 5.

Figure 7:
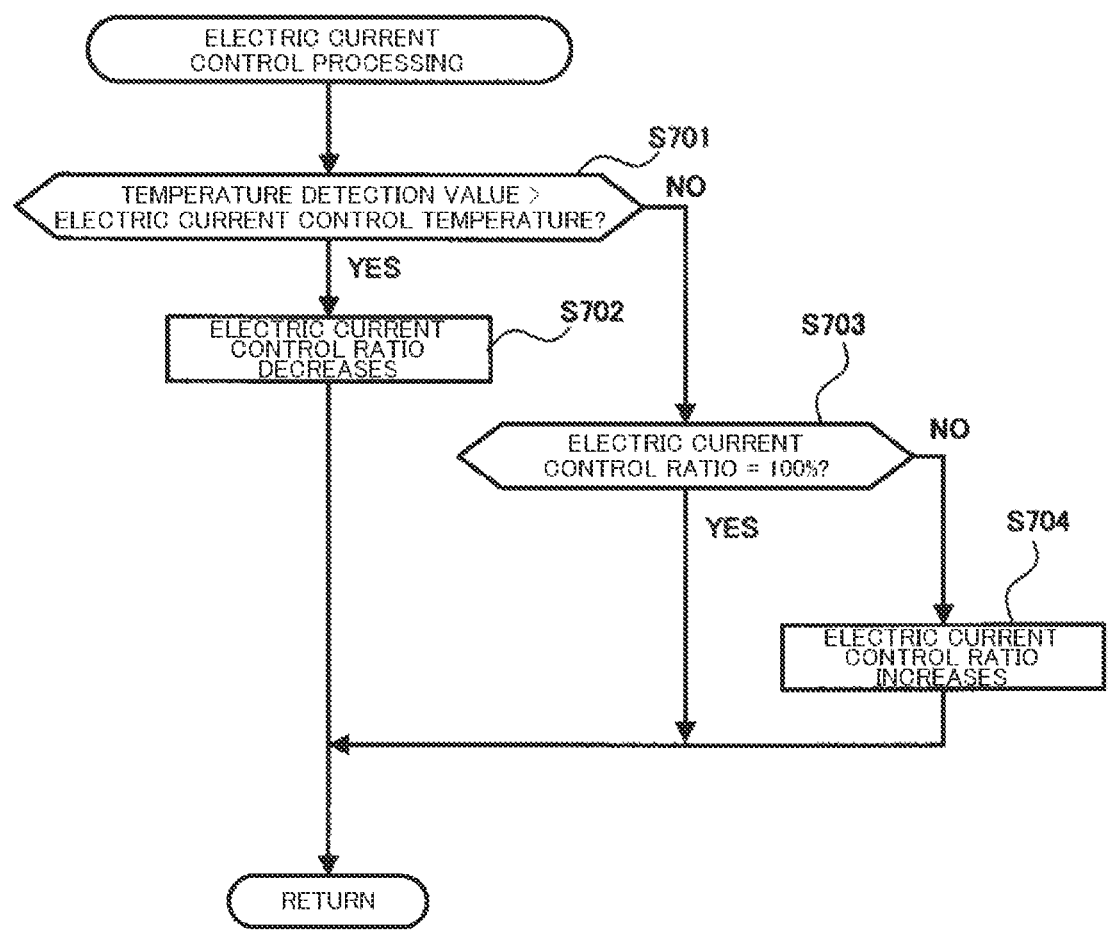
FIG. 7 is a flow chart showing a detailed example of a current control processing.

FIG. 7 is a flow chart showing a detailed example of the electric current control processing in Step S408 in FIG. 4. First of all, the processor 101 determines whether the temperature detection value calculated in Step S403 in FIG. 4 (the temperature detection value obtained from the LD thermistor while the cooling fan is revolving in the high revolution speed mode) has reached the threshold, Tf-u (Step S701).

If the temperature detection value exceeds the electric current control temperature (if the determination made by the processor 101 in Step S701 is affirmative or YES), the processor 101 executes the electric current control so as to reduce the electric current control ratio (Step S702). Thereafter, the processor 101 ends the electric current control processing (the electric current control processing in Step S408 in FIG. 4) show in the flow chart shown in FIG. 7.

If the temperature detection value does not exceed the electric current control temperature (if the determination made by the processor 101 in Step S701 is negative or NO), the processor 101 determines whether the present electric current ratio is 100% (Step S703).

If the processor 101 determines that the present electric current control ratio is 100%, this means a state in which the electric current control has not yet been started. In that case (if the determination made by the processor 101 in Step S703 is affirmative or YES), the processor 101 returns without doing anything and ends the electric current control processing (the electric current control processing in Step S408 in FIG. 4) which is shown in the flow chart shown in FIG. 7.

If the processor 101 determines that the present electric current control ratio is not 100%, this means a state in which the electric current control has already been started. If the temperature detection value is equal to or lower than the threshold (Tf-u) of the electric current control temperature (the determination made by the processor 101 in Step S701 is negative or NO), determining that the temperature has decreased sufficiently, the processor 101 increases the electric current control ratio again (Step S704). Thereafter, the processor 101 returns to end the electric current control processing (the electric current control processing in Step S408 in FIG. 4) which is shown in the flow chart shown in FIG. 7.

In the embodiment of the present invention, the processor 101 may allow the user to designate an arbitrary operation mode in multiple operation modes in the projector 100 using, for example, the keys/indicators section 113, the multiple operation modes including at least designation items regarding the light source color or brightness of the light source apparatus 110 or the quietness of the projector 100.

As has been described heretofore, in the embodiment of the present invention, the comfortable projector using environment can be provided for the user by controlling the cooling fan so as to reduce the level of noise produced from the projector while executing the highly accurate temperature control on the projector using the cooling fan.

In addition, the present invention is not limited to the embodiment that has been described heretofore. Hence, in carrying out the present invention, the present invention can be modified variously without departing from the spirit and scope thereof. In addition, in carrying out the present invention, as many functions executed in the embodiment that has been described heretofore as possible may be combined together as required. The embodiment that has been described heretofore includes various steps, and various inventions can be extruded by combining the disclosed multiple constituent factors as required. For example, even though some constituent factors are deleted from the whole constituent factors described in the embodiment, a configuration from which those constituent factors are deleted can be extruded as an invention, as long as the designed advantageous effects can be obtained.

What is claimed is:

1. A projector comprising:
a cooling fan; and
a processor,
wherein the processor determines a current revolution speed mode of the cooling fan and in a case in which the current revolution speed mode of the cooling fan is determined to be a first revolution speed mode, the processor determines whether an obtained temperature detection value has reached a first threshold, and in a case in which the obtained temperature detection value has reached the first threshold, the processor executes,
(i) a control of switching an operation mode of the cooling fan to a second revolution speed mode whose revolution speed is faster than that of the first revolution speed mode, and in a case in which the current revolution speed mode of the cooling fan is determined to be the second revolution speed mode, the processor determines whether an obtained temperature detection value decreases below a second threshold which differs from the first threshold, and in a case in which the obtained temperature detection value decreases below the second threshold, the processor executes (ii) a control of switching the operation mode of the cooling fan to the first revolution speed mode whose revolution speed is slower than that of the second revolution speed mode.

2. The projector according to claim 1,
wherein the processor executes, in a case in which the cooling fan is operating in the second revolution speed mode, an electric current control to reduce an electric current that is caused to flow to a light source apparatus in a case in which an obtained temperature detection value increases above a third threshold.

3. The projector according to claim 1,
wherein the processor executes a control to stop an operation of the projector due to an occurrence of an error in a case in which an electric current control ratio specifying a ratio of electric current that is caused to flow to the light source apparatus reaches a set value.

4. The projector according to claim 1, comprising:
a thermistor configured to detect a temperature of a portion near to a light source of a laser diode,
wherein the processor obtains the temperature detection value based on an obtained value from the thermistor.

5. The projector according to claim 1, comprising:
multiple thermistors configured to detect a temperature of a portion near to a light source of a laser diode,
wherein the processor obtains the temperature detection value based on obtained values from the multiple thermistors.

6. The projector according to claim 1,
wherein the first threshold is a value that is higher than the second threshold.

7. The projector according to claim 1,
wherein the processor executes a switching processing of switching the operation mode of the cooling fan from either of the first revolution speed mode and the second revolution speed mode to the other of the first revolution speed mode and the second revolution speed mode, in a case in which the processor determines that a set period of time has elapsed after a detection of an instruction to switch a color mode to match a color or brightness of a light source, and wherein the processor controls so that the switching processing is not executed until the set period of time has elapsed after the detection of the instruction to switch the color mode.

8. A temperature control method for a projector having a cooling fan and a processor, comprising:

causing the processor to determine a current revolution speed mode of the cooling fan and to execute, (i) in a case in which the current revolution speed mode of the cooling fan is determined to be a first revolution speed mode and in a case in which an obtained temperature detection value reaches a first threshold, a control of switching an operation mode of the cooling fan to a second revolution speed mode whose revolution speed is faster than that of the first revolution speed mode; and causing the processor to execute, (ii) in a case in which the current revolution speed mode of the cooling fan is determined to be the second revolution speed mode and in a case in which an obtained temperature detection value decreases below a second threshold which differs from the first threshold, a control of switching the operation mode of the cooling fan to the first revolution speed mode whose revolution speed is slower than that of the second revolution speed mode.

9. The temperature control method for the projector according to claim 8, comprising:

causing the processor to execute, in a case in which the cooling fan is operating in the second revolution speed mode, an electric current control to reduce an electric current that is caused to flow to a light source apparatus in a case in which an obtained temperature detection value increases above a third threshold.

10. The temperature control method for the projector according to claim 9, comprising:

causing the processor to execute a control to stop an operation of the projector due to an occurrence of an error in a case in which an electric current control ratio specifying a ratio of electric current that is caused to flow to the light source apparatus reaches a set value.

11. The temperature control method for the projector according to claim 8, comprising:

causing the processor to obtain the temperature detection value based on an obtained value from a thermistor configured to detect a temperature of a portion near to a light source of a laser diode.

12. The temperature control method for the projector according to claim 8, comprising:

causing the processor to obtain the temperature detection value based on obtained values from multiple thermistors configured to detect a temperature of a portion near to a light source of a laser diode.

13. The temperature control method for the projector according to claim 8, wherein the first threshold is a value that is higher than the second threshold.

14. The temperature control method for the projector according to claim 8, comprising:

causing the processor to execute a switching processing of switching the operation mode of the cooling fan from either of the first revolution speed mode and the second revolution speed mode to the other of the first revolution speed mode and the second revolution speed mode, in a case in which the processor determines that a set period of time has elapsed after a detection of an instruction to switch a color mode to match a color or brightness of a light source; and causing the processor to control so that the switching processing is not executed until the set period of time has elapsed after the detection of the instruction to switch the color mode.

15. A non-transitory recording medium readable by a computer, wherein the computer is caused to function as a processor configured to determine a current revolution speed mode of a cooling fan and to execute, (i) in a case in which the current revolution speed mode of the cooling fan is determined to be a first revolution speed mode and in a case in which an obtained temperature detection value reaches a first threshold, a control of switching an operation mode of the cooling fan to a second revolution speed mode whose revolution speed is faster than that of the first revolution speed mode, and to execute, (ii) in a case in which the current revolution speed mode of the cooling fan is determined to be the second revolution speed mode and in a case in which an obtained temperature detection value decreases below a second threshold which differs from the first threshold a control of switching the operation mode of the cooling fan to the first revolution speed mode whose revolution speed is slower than that of the second revolution speed mode.

* * * * *